(12) United States Patent
Yang et al.

(10) Patent No.: US 9,578,659 B2
(45) Date of Patent: *Feb. 21, 2017

(54) USER EQUIPMENT AND METHOD FOR CONTENTION-BASED COMMUNICATIONS OVER ALLOCATED PUSCH RESOURCES

(71) Applicant: Intel Corporation, Santa Clara, CA (US)

(72) Inventors: Xiangying Yang, Campbell, CA (US); Yuan Zhu, Beijing (CN); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/165,038

(22) Filed: Jan. 27, 2014

(65) Prior Publication Data

US 2014/0140304 A1   May 22, 2014

Related U.S. Application Data

(63) Continuation of application No. 13/041,125, filed on Mar. 4, 2011, now Pat. No. 8,638,738.

(Continued)

(51) Int. Cl.
*G01R 31/08* (2006.01)
*H04W 74/08* (2009.01)
(Continued)

(52) U.S. Cl.
CPC ....... *H04W 74/0833* (2013.01); *H04L 1/0041* (2013.01); *H04L 1/0061* (2013.01);
(Continued)

(58) Field of Classification Search
USPC ....... 370/338, 328, 252, 241, 294, 311, 348, 370/449, 278, 280, 282, 315, 318, 321,
(Continued)

(56) References Cited

U.S. PATENT DOCUMENTS 8,612,621 B2 * 12/2013 Wang .................. H04L 12/18
709/231
8,638,738 B2 * 1/2014 Yang ................. H04W 72/0413
370/329

(Continued)

FOREIGN PATENT DOCUMENTS

CN   101507148 A   8/2009
CN   102823316 A   12/2012

(Continued)

OTHER PUBLICATIONS

"Chinese Application Serial No. 201180016864.7, Voluntary Amendment filed Apr. 10, 2013", w/English claims, 10 pgs.

(Continued)

*Primary Examiner* — Phuongchau Ba Nguyen
(74) *Attorney, Agent, or Firm* — Schwegman Lundberg & Woessner, P.A.

(57) ABSTRACT

Methods for contention-based transmission with contention-free feedback for reduced latency in LTE Advanced networks and an enhanced PUCCH are generally disclosed herein. User equipment (UE) may transmit a contention sequence on a physical uplink control channel (PUCCH) to an enhanced-Node B (eNB) and may concurrently transmit data requesting uplink resources on a physical uplink shared channel (PUSCH) to the eNB. The contention sequence is transmitted on the PUCCH in accordance with a format that is assigned by the eNB. The contention sequence is either randomly selected by the UE or assigned by the eNB. When the contention sequence and data are not successfully received by the eNB, the UE may fall back to a more conventional random access channel (RACH) procedure for uplink resource allocation.

31 Claims, 3 Drawing Sheets

Related U.S. Application Data (60) Provisional application No. 61/311,174, filed on Mar. 5, 2010.

(51) Int. Cl.

| | | |
|---|---|---|
| *H04L 1/00* | (2006.01) | |
| *H04W 12/04* | (2009.01) | |
| *H04W 12/06* | (2009.01) | |
| *H04L 1/12* | (2006.01) | |
| *H04W 28/04* | (2009.01) | |
| *H04W 72/04* | (2009.01) | |
| *H03M 13/09* | (2006.01) | |
| *H03M 13/29* | (2006.01) | |
| *H04W 36/00* | (2009.01) | |

(52) U.S. Cl.
CPC ........... *H04L 1/0073* (2013.01); *H04W 12/04* (2013.01); *H04W 12/06* (2013.01); *H04W 36/0055* (2013.01); *H03M 13/09* (2013.01); *H03M 13/29* (2013.01); *H04L 2001/125* (2013.01); *H04W 28/04* (2013.01); *H04W 36/0038* (2013.01); *H04W 72/0413* (2013.01); *Y02B 60/50* (2013.01)

(58) Field of Classification Search
USPC .. 370/327, 329, 336, 344, 395.21, 432, 445; 455/450, 524, 343.2, 423, 458, 525, 455/552.1, 574, 67.11
See application file for complete search history.

(56) References Cited

U.S. PATENT DOCUMENTS

| | | | | |
|---|---|---|---|---|
| 2005/0135318 | A1* | 6/2005 | Walton | H04L 12/66 370/338 |
| 2006/0166688 | A1* | 7/2006 | Sun | H04B 7/2681 455/502 |
| 2008/0080472 | A1* | 4/2008 | Bertrand | H04J 11/005 370/344 |
| 2009/0046645 | A1* | 2/2009 | Bertrand | H04J 11/0069 370/329 |
| 2009/0175159 | A1 | 7/2009 | Bertrand et al. | |
| 2009/0186613 | A1 | 7/2009 | Ahn et al. | |
| 2009/0232107 | A1 | 9/2009 | Park et al. | |
| 2009/0239476 | A1 | 9/2009 | Womack et al. | |
| 2009/0323602 | A1 | 12/2009 | Li et al. | |
| 2010/0040001 | A1 | 2/2010 | Montojo et al. | |
| 2010/0040005 | A1 | 2/2010 | Kim et al. | |
| 2010/0150085 | A1* | 6/2010 | Ishii | H04L 1/00 370/329 |
| 2010/0165882 | A1* | 7/2010 | Palanki | H04W 76/023 370/254 |
| 2011/0216722 | A1 | 9/2011 | Yang et al. | |
| 2011/0292895 | A1* | 12/2011 | Wager | H04L 5/0007 370/329 |
| 2012/0093098 | A1* | 4/2012 | Charbit | H04W 72/04 370/329 |
| 2012/0106517 | A1* | 5/2012 | Charbit | H04W 72/04 370/336 |
| 2012/0184306 | A1* | 7/2012 | Zou | H04W 76/023 455/458 |
| 2012/0213183 | A1* | 8/2012 | Chen | H04W 72/1278 370/329 |

FOREIGN PATENT DOCUMENTS

| | | | |
|---|---|---|---|
| CN | 104579563 A | 4/2015 | |
| JP | 200917560 A | 1/2009 | |
| JP | 2009171589 A | 7/2009 | |
| JP | 2009525644 A | 7/2009 | |
| JP | 2011524141 A | 8/2011 | |
| JP | 2013521723 A | 6/2013 | |
| KR | 200900882867 A | 7/2009 | |
| KR | 101548890 B1 | 9/2015 | |
| RU | 2516652 C1 | 5/2014 | |
| WO | WO-2009061255 A1 | 5/2009 | |
| WO | WO-2009107947 A1 | 9/2009 | |
| WO | WO-2009113772 A1 | 9/2009 | |
| WO | WO-2009128285 A1 | 10/2009 | |
| WO | WO-2009154413 A2 | 12/2009 | |
| WO | WO-2010025249 A1 | 3/2010 | |
| WO | WO 2010/057540 A1 * | 5/2010 | ............ H04W 72/12 |
| WO | WO-2011109796 A2 | 9/2011 | |
| WO | WO-2011109796 A3 | 9/2011 | |

OTHER PUBLICATIONS

"European Application Serial No. 11751488.5, Amendment filed Apr. 23, 2013", 8 pgs.
"Japanese Application Serial No. 2012-556281, Response filed Apr. 3, 2014 to Office Action mailed Nov. 5, 2013", w/English claims, 15 pgs.
"Korean Application Serial No. 2012-7025989, Response filed Feb. 19, 2014 to Office Action mailed Dec. 19, 2013", w/English claims, 11 pgs.
"Korean Application Serial. No. 2012-7025989, Voluntary Amendment filed Dec. 3, 2013", English claims, 1 pg.
"Korean Application Serial No. 2014-7004272, Office Action mailed May 16, 2014", English translation, 1 pg.
"3rd Generation Partnership Project; Technical Specification Group Radio Access Network; Evolved Universal Terrestrial Radio Access (E-UTRA) Medium Access Control (MAC) protocol specification (Release 9)", 3GPP TS 36.321 V9.1.0, (2009), 12-17.
"U.S. Appl. No. 13/041,125 , Response filed Feb. 21, 2013 to Non Final Office Action mailed Dec. 10, 2012", 10 pgs.
"U.S. Appl. No. 13/041,125 , Response filed Aug. 19, 2013 to Final Office Action mailed May 21, 2013", 11 pgs.
"U.S. Appl. No. 13/041,125, Final Office Action mailed May 21, 2013", 14 pgs.
"U.S. Appl. No. 13/041,125, Non Final Office Action mailed Dec. 10, 2012", 17 pgs.
"U.S. Appl. No. 13/041,125, Notice of Allowance mailed Sep. 16, 2013", 16 pgs.
"International Application Serial No. PCT/US2011/027325, International Report on Patentability mailed Sep. 20, 2012", 7 pgs.
"International Application Serial No. PCT/US2011/027325, Search Report mailed Dec. 7, 2011", 5 pgs.
"International Application Serial No. PCT/US2011/027325, Written Opinion mailed Dec. 7, 2011", 5 pgs.
"Japanese Application Serial No. 2012-556281, Office Action mailed Nov. 5, 2013", 8 pgs.
"Korean Application Serial No. 2012-7025989, Notice of Preliminary Rejection mailed Dec. 19, 2013", 2 pgs.
Sesia, Stefania, et al., "19.3 Random Access Procedure", LTE, The UMTS Long Term Evolution: From Theory to Practice, Wiley Publishers, (Apr. 2009), 422-428.
"Chinese Application Serial No. 201180016864.7, Office Action mailed Jan. 6, 2015", 7 pgs.
"Chinese Application Serial No. 201180016864.7, Office Action mailed Jul. 29, 2014", 21 pgs.
"European Application Serial No. 11751488.5, Extended European Search Report mailed Sep. 17, 2014", 11 pgs.
"Japanese Application Serial No. 2014-076884, Examiners Decision of Final Refusal mailed Nov. 4, 2014", W/ English Translation, 9 pgs.
"Japanese Application Serial No. 2014-076884, Office Action mailed Dec. 24, 2014", 10 pgs.
"Korean Application Serial No. 10-2014-7004272, Office Action mailed Nov. 26, 2014", 5 pgs.
"Korean Application Serial No. 2012-7025989, Notice of Preliminary Rejection mailed Jun. 26, 2014", 9 pgs .
"Preamble Based Scheduling Request a Generic Structure", Texas Instruments, (May 7, 2007).
Ericsson, et al., "Details of latency reduction alternatives", 3GPP Draft; R2-101332 CB Latency Reduction, 3rd Generation Partner- (56) References Cited

OTHER PUBLICATIONS ship Project Mobile Competence Centre vol. RAN WG2, No. San Francisco, USA, (Feb. 16, 2010), 2 pgs.
Fan, Wang, et al., "Proposed Text of UL PHY Control Structure Section", Bandwidth Request Channel for the IEEE 802.16m Amendment vol. 802.16m, (Jan. 7, 2009), 1-8.
Huawei, "Sharing PUCCH-SR", 3GPP Draft; R2-100207 Sharing PUCCH-SR 3rd Generation Partnership Project Mobile Competence Centre vol. RAN WG2, No. Valencia, Spain, (Jan. 12, 2010).
Nokia, et al., "SR associated contention based transmission", 3GPP Draft; R2-101115 SR Associated Contention Based Transmission, 3rd Generation Partnership Project vol. RAN WG2, No. San Francisco, USA, (Feb. 16, 2010), 2 pgs.

\* cited by examiner

USER EQUIPMENT AND METHOD FOR CONTENTION-BASED COMMUNICATIONS OVER ALLOCATED PUSCH RESOURCES

PRIORITY CLAIM

This application is a continuation of U.S. patent application Ser. No. 13/041,125, filed on Mar. 4, 2011, now issued as U.S. Pat. No. 8,638,738, which claims priority under 35 U.S.C. 119(e) to U.S. Provisional Patent Application Ser. No. 61/311,174, filed Mar. 5, 2010, all of which are incorporated herein by reference in their entireties.

TECHNICAL FIELD

Embodiments pertain to wireless communications. Some embodiments relate to the Evolved Universal Terrestrial Radio Access Network (E-UTRAN) standard of the third-generation partnership project (3GPP), Release 10, known as Long Term Evolution (LTE) Advanced and referred to as LTE-A.

BACKGROUND

One issue with communicating data over a wireless network, such as a 3GPP LTE network, is latency associated with uplink access. When User Equipment (UE) has data to send, the UE may request an allocation of a resource (i.e., bandwidth) on an uplink channel for transmitting the data to an enhanced-Node B (eNB) (i.e., an LTE base station). Contention and collisions on the random access channel (RACH) as well as the overhead associated with use of the conventional RACH procedure result in lengthy delays for the UE.

Thus, there are general needs for methods of reducing latency associated with conventional uplink resource allocation requests in LTE networks. There are also general needs for an enhanced uplink control channel.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
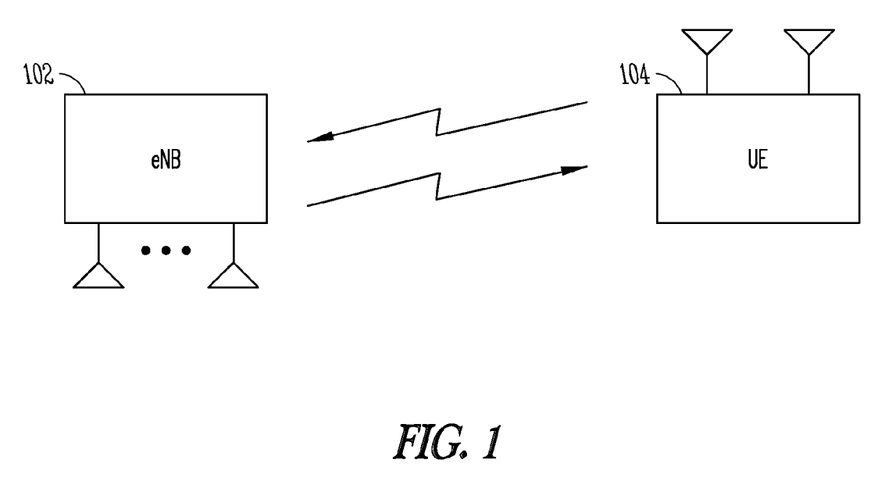
FIG. 1 illustrates an eNB and UE in accordance with some embodiments.

FIG. 1 illustrates an eNB and UE in accordance with some embodiments. The eNB 102 and UE 104 may operate as part of an LTE advanced (LTE-A) network and may communicate with each other using a plurality of channels. The eNB 102 may communicate with a plurality of UEs, including the UE 104, using an orthogonal frequency division multiple access (OFDMA) technique in the downlink, and the UE 104 may communicate with the eNB 102 using a single-carrier frequency division multiple access (SC-FDMA) technique in the uplink. Downlink channels may include a physical downlink shared channel (PDSCH), and a physical broadcast control channel (PBCCH), among others. Uplink channels may include a random access channel (RACH), a physical uplink control channel (PUCCH) and a physical uplink shared channel (PUSCH), among others. The PUSCH is generally shared by several UEs for transmitting information data to the eNB 102 in accordance with the SC-FDMA technique.

In accordance with embodiments, the UE 104 may transmit a contention sequence on a first physical uplink channel to an enhanced-Node B (eNB) 102, and may transmit data requesting uplink resources on a second physical uplink channel to the eNB 102. The contention sequence may be transmitted on the first physical uplink channel in accordance with a format that is assigned by the eNB 102. In accordance some with embodiments, the UE 104 may transmit the contention sequence on the PUCCH to the eNB 102 and transmit the data on the PUSCH to the eNB 102. The contention sequence may be transmitted on the PUCCH in accordance with a format that is assigned by the eNB 102. The contention sequence may be either randomly selected by the UE 104 or assigned by the eNB 102.

In these embodiments, the UE 104 may transmit the contention sequence on the PUCCH to the eNB 102 and transmit data on the PUSCH to the eNB 102 when the UE 104 is requesting an allocation of resources (i.e., grant of bandwidth or a resource allocation) for a subsequent uplink data transmission. In these embodiments, the UE 104 may use the PUCCH and the PUSCH for random access. The transmission of data on the PUSCH may be a request for uplink bandwidth for a subsequent uplink data transmission.

The RACH, the PUCCH and the PUSCH are defined in terms of frequency and time resources. The PUCCH and the PUSCH may comprise one or more resource blocks (RB) and one or more time slots or OFDM symbols. Each RB may comprise predetermined number of subcarriers (e.g., twelve).

In some embodiments, prior to the transmission of the contention sequence on the PUCCH and the transmission of data on the PUSCH, the UE 104 may receive an allocation of resources of the PUCCH and the PUSCH from the eNB 102 for use of the PUCCH and the PUSCH for random access (i.e., the transmission of the contention sequence on the PUCCH). The allocation of resources may be received by the UE 104 in a downlink control channel from the eNB 102. The downlink control channel may be the PBCCH (for broadcast allocations) or the PDSCH (for unicast allocations).

In accordance with some embodiments, the contention sequence may be transmitted on the PUCCH and the data may be transmitted on the PUSCH concurrently within a same subframe. When there is a restriction on concurrent transmissions within the same subframe by the UE 104, the contention sequence may be transmitted on the PUCCH and the data may be transmitted on the PUSCH within different subframes and with a fixed time-offset therebetween.

In some embodiments, the data transmission on the PUSCH may be done without an uplink grant of resources to the UE 104 by the eNB 102. In this way, a significant reduction in latency may be achieved. In some embodiments, the eNB 102 may allocate resources on the PUCCH and the PUSCH to the UE 104 for transmission of an uplink resource allocation instead of uplink data traffic. The data transmitted by the UE 104 on the PUSCH may be transmitted in accordance with the format of a unicast resource grant (i.e., a typical uplink transmission as with a unicast resource grant).

The data transmitted by the UE 104 on the PUSCH may include identification (ID) information unique to the UE 104 that was previously assigned by the eNB 102 to allow the eNB 102 to uniquely identify the particular UE 104 that has transmitted the data on the PUSCH. The data may also indicate that the UE 104 is requesting uplink channel resources for a subsequent data transmission. Accordingly, the eNB 102 is able to determine which UE has sent the data on the PUSCH.

In some embodiments, the contention sequence may be considered a codeword unique to the UE 104. The contention sequence may also be viewed as a contention preamble.

The relationship or the mapping between the data sent on the PUSCH (e.g., the association with a particular UE) and the sequence sent in the PUCCH may be defined so that the eNB 102 can associate the contention sequence received in the PUCCH and the data received in PUSCH. The data may be more vulnerable to collision and other channel impairments than the contention sequence. As a result, the contention sequence may be detected but the data may be lost. In these embodiments, a more conventional RACH procedure may be performed as a fallback. These embodiments are described in more detail below.

When the eNB 102 is unable to detect the data transmitted on the PUSCH (e.g., due to noise or due to a collision) but is able to detect the contention sequence, the eNB 102 may be configured to follow the more conventional RACH procedure as a fallback when the contention sequence was randomly selected by the UE 104 (i.e., not assigned by the eNB 102). When the eNB 102 is unable to detect the data transmitted on the PUSCH but is able to detect the contention sequence, the eNB 102 may be configured to follow a more conventional scheduling request (SR) procedure as a fallback when the contention sequence was assigned to the UE 104.

The more conventional RACH procedure may include the eNB 102 transmitting a random-access response (RAR) on the PDSCH which includes the identity of the detected sequence along with timing information. A grant of uplink resources may be provided if the sequence provided in the RAR corresponds to the contention sequence transmitted by the UE 104 and the UE 104 acknowledges receipt of the RAR. When the sequence provided in the RAR does not correspond to the contention sequence transmitted by the UE 104, the UE 104 refrains from acknowledging the RAR (i.e., a discontinuous transmission (DTX)). Similarly, when the UE 104 does not receive or is unable to decode the RAR, no response is sent by the UE 104 (also a DTX).

In the embodiments discussed above, the existing physical layer (PHY) configured in accordance with LTE may be used, however, a PUCCH-like opportunity and PUSCH opportunity may be provided together. In other embodiments discussed below, an enhanced LTE PHY is provided. In these embodiments, the UE 104 may be configured to transmit a contention sequence in a reference signal portion of the PUCCH and transmit data in a regular data portion of the PUCCH. The data may be sent in one or more RBs of the data portion of the PUCCH and two OFDM symbols may be allocated for the reference signal.

In some embodiments, the reference signal portion of a PUCCH may be a portion allocated for transmission of a demodulation reference sequence (DMRS). The reference signal portion may be time-multiplexed with the data symbols. These embodiments are discussed in more detail below.

In these embodiments, the contention sequence may be transmitted in accordance with a format that is assigned by the eNB 102. The contention sequence may be either randomly selected by the UE 104 or assigned by the eNB 102. The data transmitted the data on the PUCCH may include identification information unique to the UE 104 that was previously assigned by the eNB 102 to allow the eNB 102 to uniquely identify the UE that has transmitted the data on the PUCCH. The data transmitted on the PUCCH may also indicate that the UE 104 is requesting uplink channel resources for a subsequent uplink data transmission. In some embodiments, the PUSCH may be used for transmission of the data instead of the PUCCH.

In some embodiments, this transmission may be viewed as a slotted-ALOHA transmission and may provide minimal access latency for a subsequent information transmission. In some embodiments, the eNB 102 may be configured to detect two or more contention sequences simultaneously when specifically configured references signals are assigned to associated UEs.

In accordance with embodiments, eNB 102 may utilize two or more antennas and UE 104 may utilize two or more antennas to allow for multiple-input multiple output (MIMO) communications. In some embodiments, the eNB 102 may utilize up to eight or more antennas and may be configured for multi-user (MU) MIMO communications in which symbols for each UE may be specifically precoded for each UE prior to downlink transmission on the PDSCH.

The eNB 102 and the UE 104 may include several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may include one or more processes operating on one or more processing elements. In addition, the eNB 102 and the UE 104 may each include physical-layer circuitry for transmitting and receiving radio-frequency signals and media-access control (MAC) layer circuitry for controlling access to the wireless medium.

Figure 2:
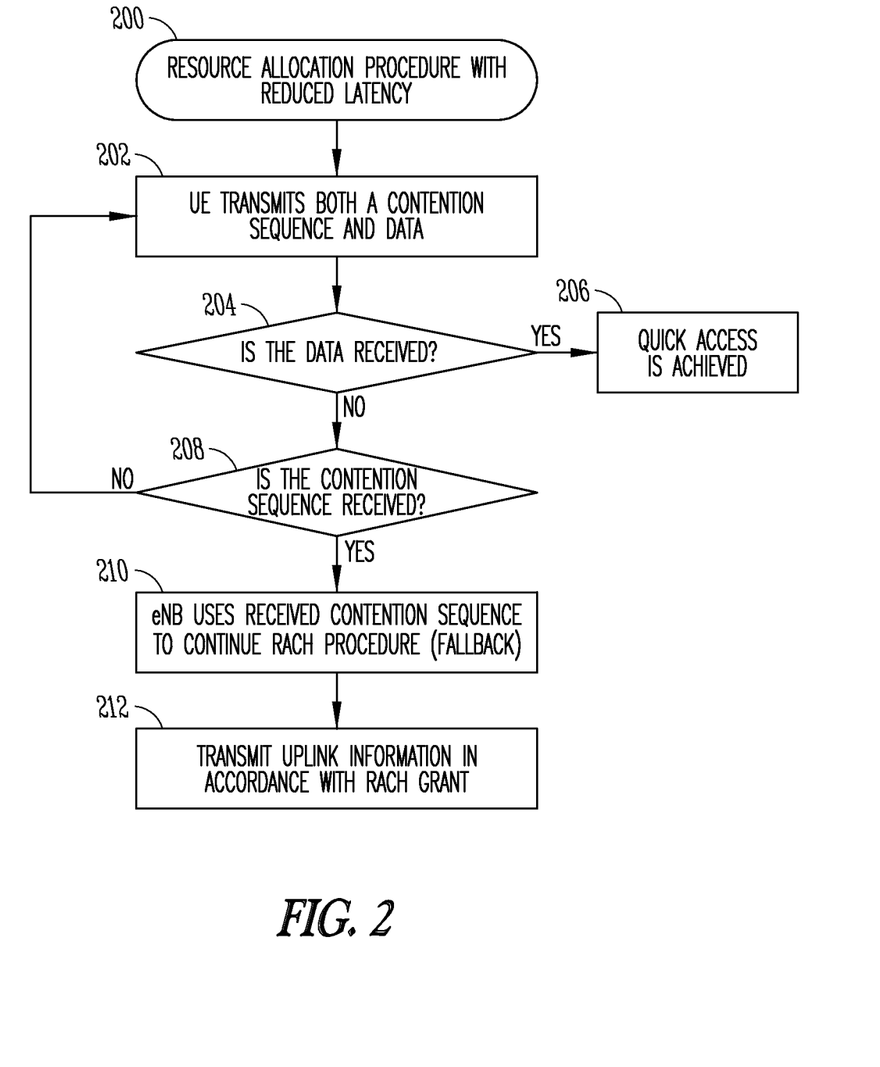
FIG. 2 is a flow diagram of a resource allocation procedure with reduced latency in accordance with some embodiments.

FIG. 2 is a resource allocation procedure with reduced latency in accordance with some embodiments. Procedure 200 may be performed by an eNB, such as eNB 102 (FIG. 1), and a UE, such as UE 104 (FIG. 1).

In operation 202, the UE 104 may transmit both a contention sequence and data. The contention sequence may be transmitted on the PUCCH to the eNB 102, and the data may be transmitted on the PUSCH to the eNB 102. The contention sequence may be transmitted in accordance with a format that is assigned by the eNB 102 and may be either randomly selected by the UE 104 or assigned by the eNB 102. The data may include identification information unique to the UE 104 and may indicate that the UE 104 is requesting uplink channel resources for a subsequent uplink data transmission.

In operation 204, the UE 104 may determine when the eNB 102 receives the data from the UE 104 (i.e., without contention). When the data is successfully received by the eNB 102, the UE 104 may receive an allocation of uplink resources and operation 206 may be performed. In operation 206, the UE 104 may transmit information to the eNB 102 in accordance with the assigned uplink resources achieving quick access.

When the data transmitted in operation 202 is not successfully received by the eNB 102, in operation 208 the eNB 102 may determine whether the contention sequence transmitted in operation 202 has been successfully received by the eNB 102. When the contention sequence has been successfully received, the eNB 102 may transmit a RAR (as discussed above) as part of a RACH procedure in operation 210.

When the contention sequence transmitted in operation 202 has not been successfully received by the eNB 102 in operation 208, the UE 104 will not receive a RAR identifying the contention sequence and may retransmit the contention sequence and the data to the eNB 102 in operation 202.

As part of the RACH procedure in operation 210, the UE 104 may receive a RACH grant of uplink resources. In operation 212, the UE 104 may transmit uplink information in accordance with the RACH grant (e.g., on the uplink resources allocated to the UE 104 on the PUSCH).

Figure 3:
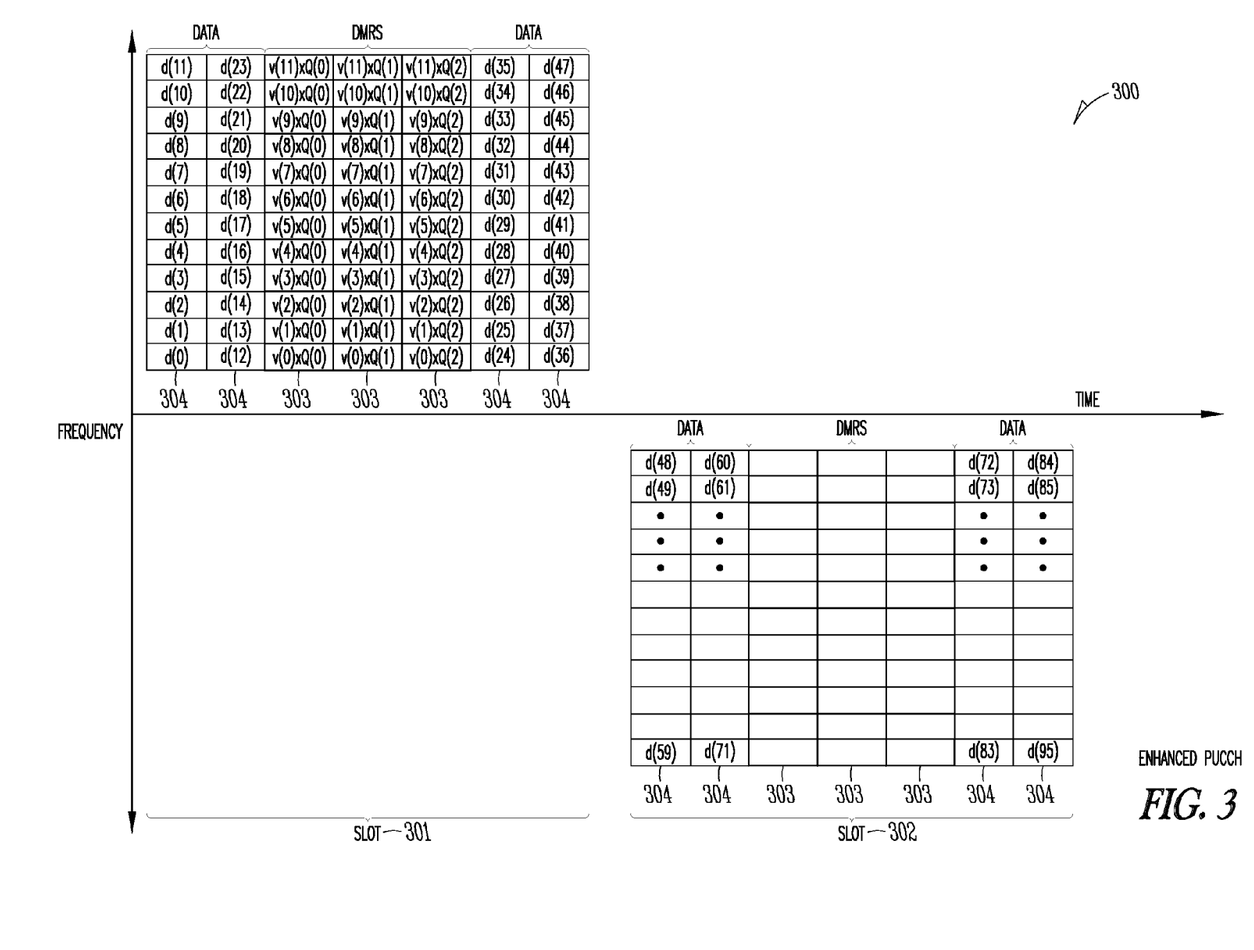
FIG. 3 illustrates the structure of an enhanced physical uplink control channel (PUCCH) in accordance with some embodiments.

FIG. 3 illustrates the structure of an enhanced PUCCH in accordance with some embodiments. The enhanced PUCCH 300 may be viewed as an extension to the PUCCH of LTE Release 8 configured in format 1/1a/1b. The enhanced PUCCH 300 may be used by a UE to request uplink resources in accordance with operation 202 (FIG. 2) of procedure 200 (FIG. 2). When the data transmitted on the enhanced PUCCH 300 is received, quick access may be achieved and the UE 104 (FIG. 1) may receive a scheduled uplink resource allocation from the eNB 102 (FIG. 1) with reduced latency.

The enhanced PUCCH 300 may occupy one RB and may comprise two slots (e.g., slot 301 and slot 302). The RB may, for example, be one millisecond (ms) long in the time-domain and may, for example, occupy 180 kHz in the frequency domain. Each slot 301, 302 may be five milliseconds long, for example, and the subcarriers may be located on opposite ends of the frequency band (i.e., at the band edges) to maximize frequency diversity. Each slot 301 and 302 may include three demodulation reference symbols (DMRS) 303 and four data symbols 304. Each symbol may utilize a set of subcarriers. In this example, twelve subcarriers per symbol are illustrated.

In accordance with embodiments, the enhanced PUCCH 300 may use seventy-two subcarriers to carry the DMRS as a preamble (e.g., twelve subcarriers×three symbols per slot× two slots). In these embodiments, thirty-six preamble sequences may be defined using two-dimensional spreading. The two-dimensional spreading of LTE rel. 8, for example, may be used. In these embodiments, ninety-six data subcarriers may be used to carry a set of information bits (twelve subcarriers×four data symbols per slot×two slots) (illustrated as d(0) through d(95) in FIG. 3). The DMRS of slot 301 may be the same as the DMRS of slot 302. The information bits may be first encoded using a ¼ tail-biting convolutional code (TBCC) code and may be QPSK modulated onto the ninety-six data symbols and mapped to the ninety-six data subcarriers utilized by the data symbols 304 of the enhanced PUCCH 300. After the eNB 102 detects the preamble sequence, it will use the preamble sequence as the DMRS 303 to coherently detect the information bits in the data portion of the enhanced PUCCH 300. When two or more preamble sequences are detected at the same time, the eNB 102 may utilize MIMO signal processing techniques, such as maximum-likelihood (ML) detection, to decode information bits of two or more UEs at the same time.

The data portion of the enhanced PUCCH 300 may include all the data symbols 304. In the example of FIG. 3, the data portion includes eight data symbols 304 (e.g., four per slot) utilizing ninety-six subcarriers. For example, when the total ninety-six data subcarriers are used to carry forty information bits, the forty information bits may be first appended with eight CRC bits, and the forty-eight bits may then be encoded using ¼ TBCC code into 192 encoded bits. Then the 192 encoded bits are QPSK modulated into the ninety-six data symbols. The ninety-six data symbols will be mapped to the ninety-six subcarriers of the data portion of the enhanced PUCCH 300. The eNB 102 may use the preamble sequence as the DMRS to coherently detect the 40 information bits in the data portion of the enhanced PUCCH 300.

In these embodiments, thirty-six preamble sequences of the DMRS 303 may be selected to carry five bits by using pseudo-random sequence selection functions. In these embodiments, one RB may carry up to forty-five information bits. In some embodiments, some of these information bits can be used to carry the Radio Network Temporary Identifier (RNTI) of the UE 104, and the remaining bits may be used to carry signaling bits.

In some embodiments, a cyclic-shifted length twelve Zadoff-Chu (ZC) sequence may be used for the DMRS for one OFDM symbol. In the time domain, a length three orthogonal cover may be used to spread the length twelve DMRS into three length twelve DMRS symbols for mapping to the three DMRS OFDM symbols. As illustrated in FIG. 3, the sequence may be indexed in terms of v(n) for each of the twelve subcarriers subcarrier and Q(n) for each of the three symbols of the DMRS 303.

For the data portion of the enhanced PUCCH 300, one bit of information will be modulated and spread over time using length four orthogonal cover and further spread in the frequency domain using one cyclic-shifted ZC sequence to become four columns of length twelve data which can be mapped to the four data OFDM symbols of each slot.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, eNB 102 or UE 104 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method perforated by user equipment (UE) for random access transmission of user data, the method comprising:

receiving an allocation of physical uplink shared channel (PUSCH) resources from an enhanced or evolved Node B (eNB) for random access;

transmitting a contention sequence and user data on the allocated resources in accordance with a random-access technique, wherein the contention sequence comprises a codeword unique to the UE or a contention preamble;

performing a procedure for grant of PUSCH resources for use in accordance with a non-random access technique when the user data is successfully received; and refraining from performing a procedure for grant of PUSCH resources for use in accordance with a non-random access technique when the user data is successfully received.

2. The method of claim 1 wherein the procedure for grant of PUSCH resources is a random-access channel (RACH) procedure.

3. The method of claim 1 wherein the procedure for grant of PUSCH resources is a scheduling request (SR) procedure, wherein the scheduling request procedure is performed to receive a grant of exclusive PUSCH resources for use in accordance with the non-random access technique.

4. The method of claim 3 wherein a scheduling request procedure is performed when the contention sequence had been successfully received and when the user data was not successfully received.

5. The method of claim 1 wherein transmitting the user data comprises transmitting user data that does not include a request for channel resources.

6. The method of claim 1 further comprising transmitting the user data on the allocated PUSCH channel resources directly to another HE in accordance with power constraint information provided by the eNB,
wherein the allocated PUSCH channel resources are within licensed spectrum.

7. A method performed by user equipment (UE) comprising:
receiving an allocation of physical uplink shared channel (PUSCH) resources from an enhanced or evolved Node B (eNB); and
transmitting a sequence and a payload within the allocated PUSCH resources for receipt by another UE, the sequence comprising a contention sequence that comprises a codeword unique to the UE or a contention preamble;
performing a procedure for want of PUSCH resources for use in accordance with a non-random access technique when the user data is not successfully received; and
refraining from performing a procedure for grant of PUSCH resources for use in accordance with a non-random access technique when the user data is successfully received.

8. The method of claim 7 wherein the sequence comprises an uplink reference signal that is transmitted within a reference signal portion of the allocated PUSCH resources,
wherein the payload is transmitted with a data portion of the allocated PUSCH resources, and
wherein the data portion does not include a request for channel resources.

9. The method of claim 7 wherein the sequence is a demodulation reference sequence (DM-RS).

10. The method of claim 7 wherein the allocation of PUSCH resources is a non-exclusive allocation, and
wherein the sequence and the payload are transmitted in accordance with a random-access technique.

11. The method of claim 7 wherein the allocation of PUSCH resources is received for use in device-to-device UE discovery and communication, and
wherein the sequence and the payload are transmitted within the allocated PUSCH resources for receipt directly by another UE without involvement of the eNB.

12. The method of claim 11 further comprising performing a device discovery process to identify the another UE.

13. The method of claim 12 further comprising performing proximity sensing to identify the another UE.

14. The method of claim 7 further comprising communicating with the another UE within additional allocated PUSCH resources.

15. The method of claim 7 wherein transmitting the data portion comprises transmitting the data portion on the allocated PUSCH resources directly to another UE in accordance with power constraint information provided by the eNB, and
wherein the allocated PUSCH resources are within licensed spectrum.

16. The method of claim 7 wherein prior to receiving the allocation of PUSCH resources, the method includes:
performing a procedure for grant of PUSCH resources in accordance with a random-access channel (RACH) procedure.

17. The method of claim 7 wherein prior to receiving the allocation of PUSCH resources, the method includes performing a procedure for grant of PUSCH resources in accordance with a scheduling request (SR) procedure.

18. The method of claim 7 further comprising receiving a second sequence within a reference signal portion and a second payload within a data portion of the allocated PUSCH resources from another UE,
wherein the second sequence is a demodulation reference sequence (DM-RS).

19. User equipment (UE) comprising a transceiver arranged to:
receive an allocation of physical uplink shared channel (PUSCH) resources from an enhanced or evolved Node B (eNB); and
transmit a sequence and a payload within the allocated PUSCH resources for receipt by another UE, the sequence comprising a contention sequence that comprises a codeword unique to the UE or a contention preamble;
performing a procedure for grant of PUSCH resources for use in accordance with a non-random access technique when the user data is not successfully received; and
refraining from performing a procedure for grant of PUSCH resources for use in accordance with a non-random access technique when the user data is successfully received.

20. The UE of claim 19 wherein the sequence comprises an uplink reference signal that is transmitted within a reference signal portion of the allocated PUSCH resources,
wherein the payload is transmitted with a data portion of the allocated PUSCH resources, and
wherein the data portion does not include a request for channel resources.

21. The UE of claim 19 wherein the sequence is a demodulation reference sequence (DM-RS).

22. The UE of claim 19 wherein the allocation of PUSCH resources is a non-exclusive allocation, and
wherein the sequence and the payload are transmitted in accordance with a random-access technique.

23. The UE of claim 22 wherein the allocation of PUSCH resources is received for use in device-to-device UE discovery and communication, and
wherein the sequence and the payload are transmitted within the allocated PUSCH resources for receipt directly by another HE without involvement of the eNB.

24. The UE of claim 23 wherein the data portion is transmitted on the allocated PUSCH resources directly to another UE in accordance with power constraint information provided by the eNB, and
wherein the allocated PUSCH resources are within licensed spectrum.

25. The method of claim 1 further comprising, when the contention sequence, unlike the user data, is able to be detected, subsequently providing the user data differently dependent on how the UE obtained the contention sequence.

26. The method of claim 25 wherein how the UE obtained the contention sequence comprises one of randomly selecting the contention sequence by the UE or receiving the contention sequence from the eNB.

27. The method of claim 1 further comprising:
receiving a restriction on concurrent transmissions within a same subframe; and
in response to receiving the restriction, transmitting the contention sequence on physical uplink control channel (PUCCH) resources and the user data on the PUSCH resources within different subframes and with a fixed time-offset therebetween.

28. The method of claim 1 further comprising:
receiving a random-access response (RAR) from the eNB;
determining whether the RAR is able to be decoded, whether the RAR comprises an identity of a detected sequence, and whether the detected sequence corresponds to the contention sequence;
acknowledging receipt of the RAR in response to the detected sequence corresponding to the contention sequence and otherwise refraining from acknowledging the RAR; and
receiving a grant of uplink resources in response to acknowledging receipt of the RAR.

29. A method performed by user equipment (UE) for random access transmission of user data, the method comprising:
receiving an allocation of physical uplink shared channel (PUSCH) resources from an enhanced or evolved Node B (eNB) for random access;
transmitting a contention sequence and user data on the allocated resources in accordance with a random-access technique, wherein the contention sequence comprises a codeword unique to the UE or a contention preamble;
receiving a restriction on concurrent transmissions within a same subframe; and
in response to receiving the restriction, transmitting the contention sequence on physical uplink control channel (PUCCH) resources and the user data on the PUSCH resources within different subframes and with a fixed time-offset therebetween.

30. A method performed by user equipment (UE) for random access transmission of user data, the method comprising:
receiving an allocation of physical uplink shared channel 0~U SCH) resources from an enhanced or evolved Node B (eNB) for random access;
transmitting a contention sequence and user data on the allocated resources in accordance with a random-access technique, wherein the contention sequence comprises a codeword unique to the UE or a contention preamble;
receiving a random-access response (RAR) from the eNB;
determining whether the RAR is able to be decoded, whether the RAR comprises an identity of a detected sequence, and whether the detected sequence corresponds to the contention sequence;
acknowledging receipt of the RAR in response to the detected sequence corresponding to the contention sequence and otherwise refraining from acknowledging the RAR; and
receiving a grant of uplink resources in response to acknowledging receipt of the RAR.

31. A method performed by user equipment (UE) for random access transmission of user data, the method comprising:
receiving an allocation of physical uplink shared channel (PUSCH) resources from an enhanced or evolved Node B (eNB) for random access;
transmitting a contention sequence and user data on the allocated resources in accordance with a random-access technique;
performing a procedure for grant of PUSCH resources for use in accordance with a non-random access technique when the user data, is not successfully received; and
refraining from performing a procedure for grant of PUSCH resources for use in accordance with a non-random access technique when the user data is successfully received.

* * * * *

UNITED STATES PATENT AND TRADEMARK OFFICE
CERTIFICATE OF CORRECTION

PATENT NO. : 9,578,659 B2  
APPLICATION NO. : 14/165038  
DATED : February 21, 2017  
INVENTOR(S) : Yang et al.

Page 1 of 1

It is certified that error appears in the above-identified patent and that said Letters Patent is hereby corrected as shown below:

On the Title Page

On page 2, in Column 2, under "Other Publications", Line 47, delete "Nov. 4, 2014"," and insert --Nov. 4, 2015",-- therefor In the Claims In Column 7, Line 34, in Claim 6, delete "HE" and insert --UE-- therefor In Column 7, Line 48, in Claim 7, delete "want" and insert --grant-- therefor In Column 9, Line 6, in Claim 23, delete "HE" and insert --UE-- therefor In Column 10, Line 15, in Claim 30, delete "0~U SCH)" and insert --(PUSCH)-- therefor Signed and Sealed this
Fourth Day of June, 2019

Andrei Iancu
*Director of the United States Patent and Trademark Office*